United States Patent [19]

Ryan

[11] Patent Number: 5,093,777
[45] Date of Patent: Mar. 3, 1992

[54] METHOD AND APPARATUS FOR PREDICTING ADDRESS OF A SUBSEQUENT CACHE REQUEST UPON ANALYZING ADDRESS PATTERNS STORED IN SEPARATE MISS STACK

[75] Inventor: Charles P. Ryan, Phoenix, Ariz.

[73] Assignee: Bull HN Information Systems Inc., Billerica, Mass.

[21] Appl. No.: 364,943

[22] Filed: Jun. 12, 1989

[51] Int. Cl.⁵ .................. G06F 12/06; G06F 12/08
[52] U.S. Cl. .................. 395/400; 364/243.4; 364/244.3; 364/246; 364/263.1; 364/264; 364/265.3; 364/253; 364/253.1; 364/224.2; 364/275.9; 364/DIG. 1
[58] Field of Search ... 364/200 MS File, 900 MS File

[56] References Cited

U.S. PATENT DOCUMENTS

| | | | |
|---|---|---|---|
| 4,317,168 | 2/1982 | Messina et al. | 364/200 |
| 4,370,710 | 1/1983 | Kroft | 364/200 |
| 4,371,924 | 2/1983 | Schaefer et al. | 364/200 |
| 4,583,165 | 4/1986 | Rosenfeld | 364/200 |
| 4,679,141 | 7/1987 | Pomerene et al. | 364/200 |
| 4,888,679 | 12/1989 | Fossum et al. | 364/200 |
| 4,912,626 | 3/1990 | Fiacconi | 364/200 |
| 4,943,908 | 7/1990 | Emma et al. | 364/200 |
| 4,980,823 | 12/1990 | Liu | 364/200 |

*Primary Examiner*—Thomas C. Lee
*Assistant Examiner*—Mehmet Geckil
*Attorney, Agent, or Firm*—J. S. Solakian; J. H. Phillips

[57] ABSTRACT

In a data processing system which employs a cache memory feature, a method and exemplary special purpose apparatus for practicing the method are disclosed to lower the cache miss ratio for called operands. Recent cache misses are stored in a first in, first out miss stack, and the stored addresses are searched for displacement patterns thereamong. Any detected pattern is then employed to predict a succeeding cache miss by prefetching from main memory the signal identified by the predictive address. The apparatus for performing this task is preferably hard wired for speed purposes and includes subtraction circuits for evaluating variously displaced addresses in the miss stack and comparator circuits for determining if the outputs from at least two subtraction circuits are the same indicating a pattern yielding information which can be combined with an address in the stack to develop a predictive address.

7 Claims, 2 Drawing Sheets

METHOD AND APPARATUS FOR PREDICTING ADDRESS OF A SUBSEQUENT CACHE REQUEST UPON ANALYZING ADDRESS PATTERNS STORED IN SEPARATE MISS STACK

FIELD OF THE INVENTION

This invention relates to the art of data processing systems which include a cache memory feature and, more particularly, to a method and apparatus for predicting memory cache misses for operand calls and using this information to transfer data from a main memory to cache memory to thereby lower the cache miss ratio.

BACKGROUND OF THE INVENTION

The technique of employing a high speed cache memory intermediate a processor and a main memory to hold a dynamic subset of the information in the main memory in order to speed up system operation is well known in the art. Briefly, the cache holds a dynamically variable collection of main memory information fragments selected and updated such that there is a good chance that the fragments will include instructions and/or data required by the processor in upcoming operations. If there is a cache "hit" on a given operation, the information is available to the process much faster than if main memory had to be accessed to obtain the same information. Consequently, in many high performance data processing systems, the "cache miss ratio" is on of the major limitations on the system execution rate, and it should therefore be kept as low as possible.

The key to obtaining a low cache miss ratio is obviously one of carefully selecting the information to be placed in the cache from main memory at any given instant. There are several techniques for selecting blocks of instructions for transitory residence in the cache, and the more or less linear use of instructions in programming renders these techniques statistically effective. However, the selection of operand information to be resident in cache memory at a given instant has been much less effective and has been generally limited to transferring one or more contiguous blocks including a cache miss address. This approach only slightly lowers the cache miss ratio and is also an ineffective use of cache capacity.

Thus, those skilled in the art will understand that it would be highly desirable to provide means for selecting operand information for transitory storage in a cache memory in such a manner as to significantly lower the cache miss ratio, and it is to that end that the present invention is directed.

OBJECTS OF THE INVENTION

It is therefore a broad object of this invention to provide an improved cache memory in a data processing system.

The subject matter of the invention is particularly pointed out and distinctly claimed in the concluding portion of the specification. The invention, however, both as to organization and method in which the cache miss ratio for operands is significantly lowered.

SUMMARY OF THE INVENTION

Briefly, these and other objects of the invention are achieved by special purpose apparatus in the cache memory which stores recent cache misses and searches for patterns therein. Any detected pattern is then employed to anticipate a succeeding cache miss by prefetching from main memory the block containing the predicted cache miss.

DESCRIPTION OF THE DRAWING

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawing of which:

DETAILED DESCRIPTION OF THE INVENTION

Figure 1:
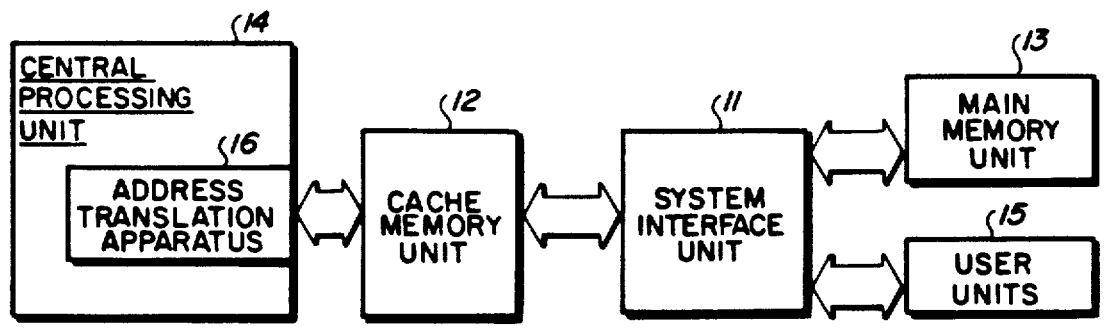
FIG. 1 is a generalized block diagram of a typical data processing system employing a cache memory and therefore constituting an exemplary environment for practicing the invention.

Referring now to FIG. 1, there is shown a high level block diagram for a data processing system incorporating a cache memory feature. Those skilled in the art will appreciate that this block diagram is only exemplary and that many variations on it are employed in practice. Its function is merely to provide a context for discussing the subject invention. Thus, the illustrative data processing system includes a main memory unit 13 which stores the data signal groups (i.e., information words, including instructions and operands) required by a central processing unit 14 to execute the desired procedures. Signal groups with an enhanced probability for requirement by the central processing unit 14 in the near term are transferred from the main memory unit 13 (or a user unit 15) through a system interface unit 11 to a cache memory unit 12. (Those skilled in the art will understand that, in some data processing system architectures, the signal groups are transferred over a system bus, thereby requiring an interface unit for each component interacting with the system bus.) The signal groups are stored in the cache memory unit 12 until requested by the central processing unit 14. To retrieve the correct signal group, address translation apparatus 16 is typically incorporated to convert a virtual address (used by the central processing unit 14 to identify the signal group to be fetched) to the real address used for that signal group by the remainder of the data processing system to identify the signal group.

The information stored transiently in the cache memory unit 12 may include both instructions and operands stored in separate sections or stored homogeneously. Preferably, in the practice of the present invention, instructions and operands are stored in separate (at least in the sense that they do not have commingled addresses) memory sections in the cache memory unit 12 inasmuch as it is intended to invoke the operation of the present invention as to operand information only.

The present invention is based o recognizing and taking advantage of sensed patterns in cache misses resulting from operand calls. In an extremely elementary example, consider a sensed pattern in which three consecutive misses ABC are, in fact, successive operand addresses with D being the next successive address. This might take place, merely by way of example, in a data manipulation process calling for successively accessing successive rows in a single column of data. If this pattern is sensed, the likelihood that signal group D will also be accessed, and soon, is enhanced such that its prefetching into the cache memory unit 12 is in order.

Figure 2:
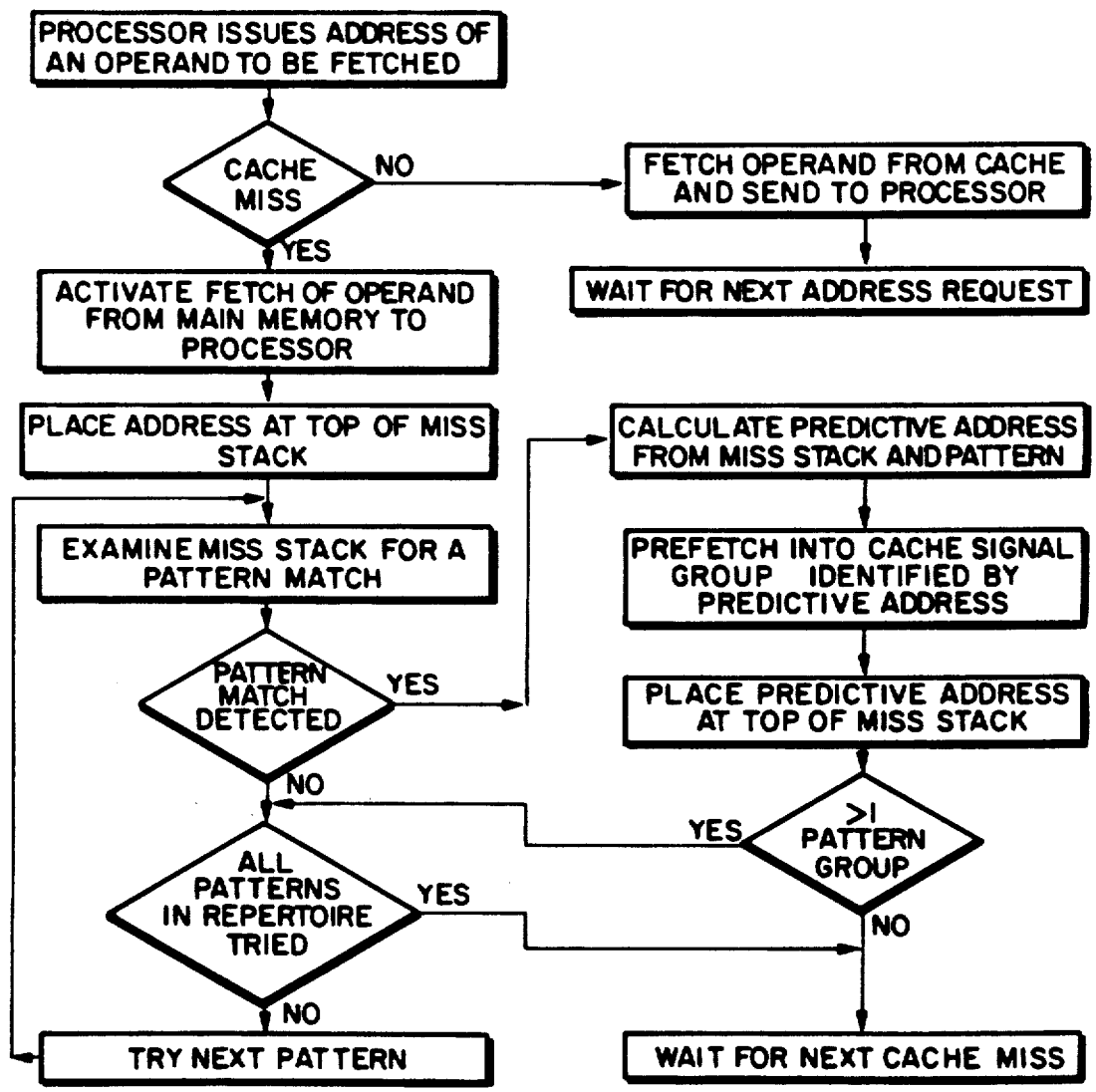
FIG. 2 is a flow diagram illustrating, in simplified form, the sequence of operations by which the invention is practiced.

The fundamental principles of the invention are set forth in the operational flow chart of FIG. 2. When a processor (or other system unit) asks for an operand, a determination is made as to whether or not the operand is currently resident in the cache. If so, there is a cache hit (i.e., no cache miss), the operand is sent to the requesting system unit and the next operand request is awaited. However, if there is a cache miss, the request is, in effect, redirected to the (much slower) main memory.

Those skilled in the art will understand that the description to this point of FIG. 2 describes cache memory operation generally. In the present invention, however, the address of the cache miss is meaningful. It is therefore placed at the top of a miss stack which will be described in further detail below. The miss stack (which contains a history of the addresses of recent cache misses in consecutive order) is then examined to determine if a first of several patterns is present. This first pattern might be, merely by way of example, contiguous addresses for the recent cache misses. If the first pattern is not sensed, additional patterns are tried. Merely by way of example again, a second pattern might be recent cache misses calling for successive address situated two locations apart. So long as there is no pattern match, the process continues through the pattern repertoire. If there is no match when all patterns in the repertoire have been examined, the next cache miss is awaited to institute the process anew.

However, if a pattern in the repertoire is detected, a predictive address is calculated from the information in the miss stack and from the sensed pattern. This predictive address is then employed to prefetch from main memory into cache the signal group identified by the predictive address. In the elementary example previously given, if a pattern is sensed in which consecutive operand cache miss operand addresses ABC are consecutive and contiguous, the value of the predictive address, D, will be C+1.

In order to optimize the statistical integrity of the miss stack, the predictive address itself may be placed at the top of the stack since it would (highly probably) itself have been the subject of a cache miss if it had not been prefetched in accordance with the invention.

Since speed of operation is essential, the invention may advantageously be embodied in a hard wired form (e.g., in a gate array) although firmware control is contemplated. Consider first a relatively simple hardwired implementation shown in FIG. 3. A miss stack 20 holds the sixteen most recent cache miss addresses, the oldest being identified as address P with entry onto the stack being made at the top. Four four-input electronic switches 21, 22, 23, 24 are driven in concert by a shift pattern signal via line 25 such that: in a first state, addresses A, B, C, D appear at the respective outputs of the switches; in a second state, addresses B, D, F, H appear at the outputs; in a third state, addresses C, F, I, L appear at the outputs; and in a fourth state, addresses D, H, L, P appear at the outputs. Subtraction circuits 26, 27, 28 are connected to receive as inputs the respective outputs of the electronic switches 21, 22, 23, 24 such that: the output from the subtraction circuit 26 is the output of the switch 21 minus the output of the switch 22; the output from the subtraction circuit 27 is the output of the switch 22 minus the output of the switch 23; and the output from the subtraction circuit 28 is the output of the switch 23 minus the output of the switch 24.

The output from the subtraction circuit 26 is applied to one input of an adder circuit 31 which has its other input driven by the output of the electronic switch 21. In addition, the output from the subtraction circuit 26 is also applied to one input of a comparator circuit 29. The output from the subtraction circuit 27 is applied to the other input of the comparator circuit 29 and also to one input of another comparator circuit 30 which has its other input driven by the output of the subtraction circuit 28. The outputs from the comparator circuits 29, 30 are applied, respectively, to the two inputs of an AND-gate 32 which selectively issues a prefetch enable signal.

Figure 3:
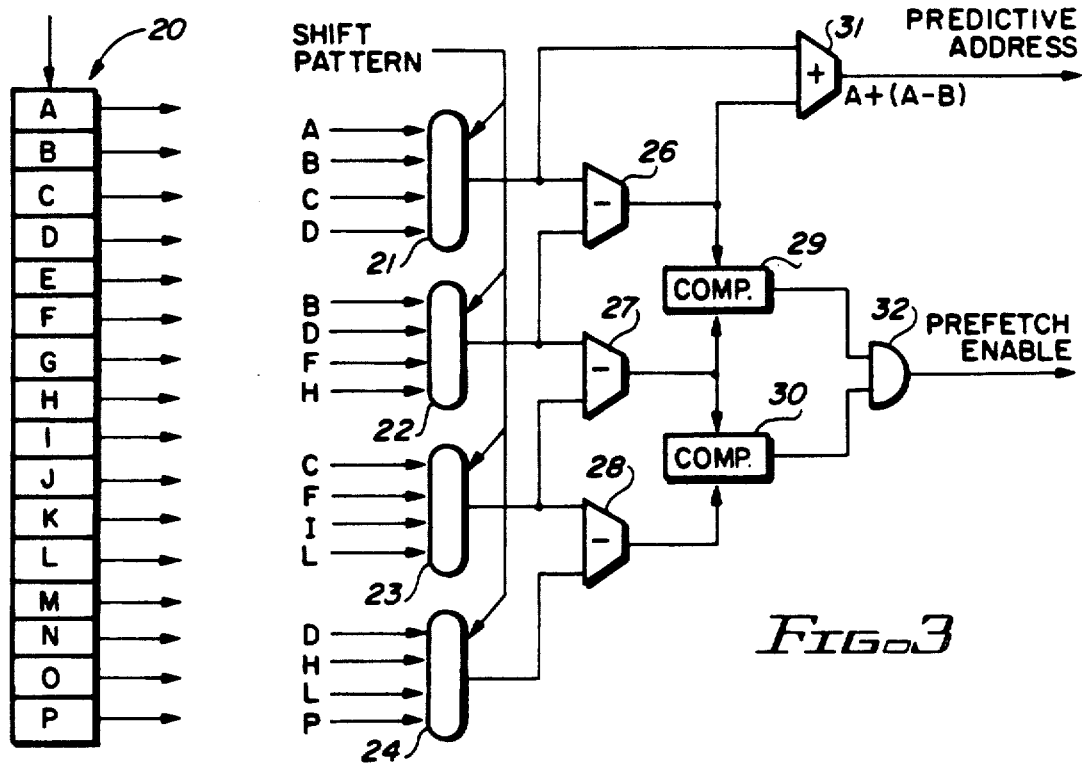
FIG. 3 is a logic diagram of a simple exemplary embodiment of the invention.

Consider now the operation of the circuit shown in FIG. 3. As previously noted, miss stack 20 holds the last sixteen cache miss addresses, address A being the most recent. When the request for the signal group identified by address A results in a cache miss, circuit operation is instituted to search for a pattern among the addresses resident in the miss stack. The electronic switches 21, 22, 23, 24 are at their first state such that address A is passed through to the output of switch 21, address B appears at the output of switch 22, address C appears at the output of switch 23 and address D appears at the output of switch 24. If the differences between A and B, B and C, and C and D are not all equal, not all the outputs from the subtraction circuits 26, 27, 28 will be equal such that one or both the comparator circuits 29, 30 will issue a no compare; and AND-gate 32 will not be enabled, thus indicating a "no pattern match found" condition.

The switches are then advanced to their second state in which addresses B, D, F, H appear at their respective outputs. Assume now that $(B-D)=(D-F)=(F-H)$; i.e., a sequential pattern has been sensed in the address displacements. Consequently, both the comparators 29, 30 will issue compare signals to fully enable the AND-gate 32 and produce a prefetch enable signal. Simultaneously, the output from the adder circuit 31 will be the predictive address $(B+(B-D))$. It will be seen that this predictive address extends the sensed pattern and thus increases the probability that the prefetched signal group will requested by the processor, thereby lowering the cache miss ratio.

If a pattern had not have been sensed in the address combination BDFH, the electronic switches would have been advanced to their next state to examine the address combination CFIL and then on to the address combination DHLP if necessary. If no pattern was sensed, the circuit would await the next cache miss which will place a new entry at the top of the miss stack and push address P out the bottom of the stack before the pattern match search is again instituted.

Figure 4:
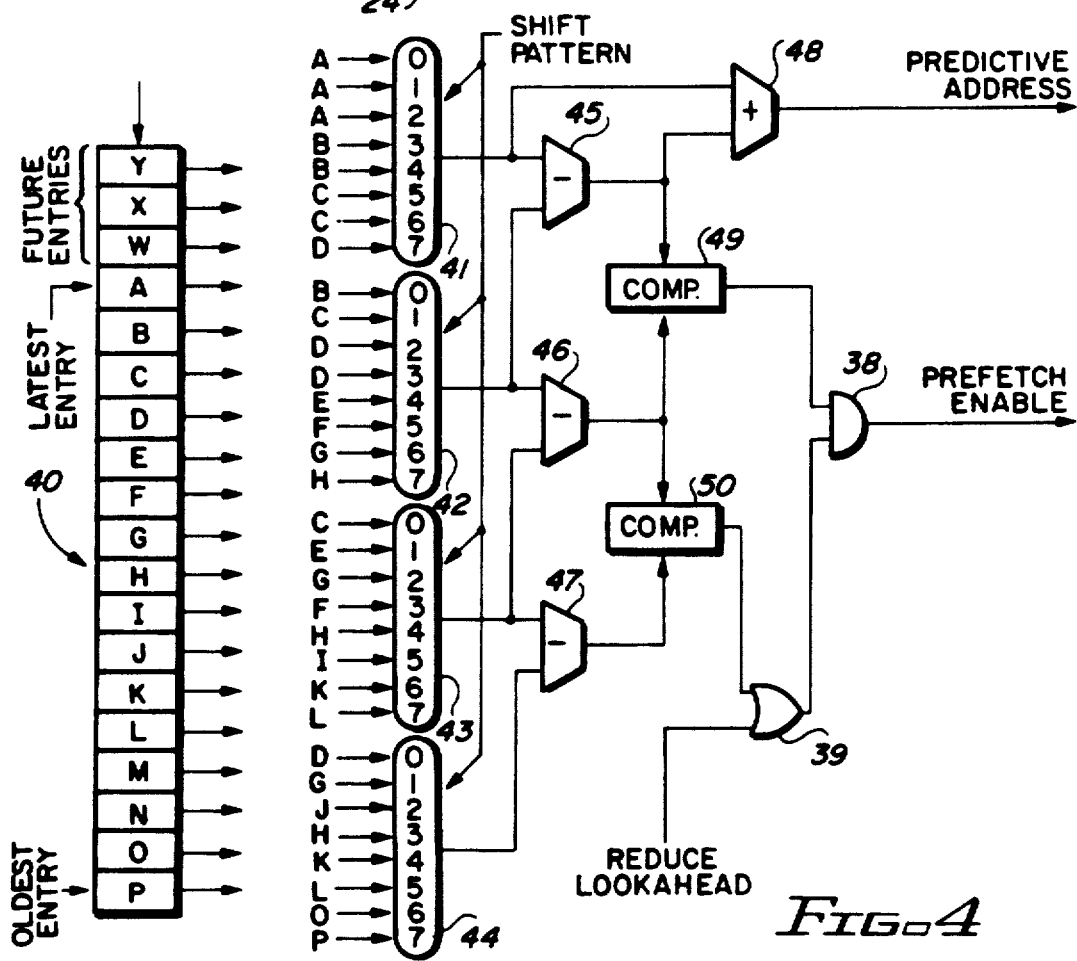
FIG. 4 is a logic diagram of a more powerful exemplary embodiment of the invention.

Consider now the somewhat more complex and powerful embodiment of the invention illustrated in FIG. 4. Electronic switches 41, 42, 43, 44 receive at their respective inputs recent cache miss addresses as stored in the miss stack 40 in the exemplary arrangement shown. It will also be noted that each of the electronic switches 41, 42, 43, 44 has eight inputs which can be sequentially selectively transferred to the single outputs under the influence of the shift pattern signal. It will also be noted that the miss stack 40 stores, in addition to the sixteen latest cache miss addresses A−P, three future entries WXY. Subtraction circuits 45, 46, 47 perform the same office as the corresponding subtraction circuits 26, 27, 28 of the FIG. 3 embodiment previously described. Similarly, adder circuit 48 corresponds to the adder circuit 31 previously described.

Comparator circuit 49 receives the respective outputs of the subtraction circuits 45, 46, and its output is applied to one input of an AND-gate 38 which selectively issues the prefetch enable signal. Comparator circuit 50 receives the respective outputs of the subtraction circuits 46, 47, but, unlike its counterpart comparator 30 of the FIG. 3 embodiment, its output is applied to one input of an OR-gate 39 which has it output input driven by a reduce lookahead signal. The output of OR-gate 39 is coupled to the other input of AND-gate 38. With this arrangement, activation of the reduce lookahead signal enables OR-GATE 39 and partially enables AND-gate 38. The effect of applying the reduce lookahead signal is to compare only the outputs of the subtraction circuits 45, 46 in the comparator circuit 49 such that a compare fully enables the AND-gate 38 to issue the prefetch enable signal. This mode of operation may be useful, for example, when the patterns seem to be changing every few cache misses, and it favors the most recent examples.

With the arrangement of FIG. 4, it is advantageous to try all the patterns within pattern groups (as represented by the "YES" response to the ">1 PATTERN GROUP?" query in the flow diagram of FIG. 2) even if there is a pattern match detected intermediate the process. This follows from the fact that more than one of the future entries WXY to the miss stack may be developed during a single pass through the pattern repertoire or even a subset of the pattern repertoire. With the specific implementation of FIG. 4 (which is only exemplary of many possible useful configurations), the following results are obtainable:

| SWITCH STATE | PATTERN | GOAL |
|---|---|---|
| 0 | ABCD | W |
| 1 | ACEG | X |
| 2 | ADGJ | Y |
| 3 | BDFH | W |
| 4 | BEHK | X |
| 5 | CFIL | W |
| 6 | CGKO | X |
| 7 | DHLP | W |

The goal states are searched in groups by switch state; i.e.: Group 1 includes switch states 0, 1, 2 and could result in filling future entries WXY; Group 2 includes states 3, 4 and could result in filling entries WX; Group 3 includes states 5, 6 and could also result in filling entries WX; and Group 4 includes state 7 and could result in filling entry W. When a goal state is reached that has been predicted, the search is halted for the current cache miss; i.e., it would not be desirable to replace an already developed predictive address W with a different predictive address W.

Those skilled in the art will understand that the logic circuitry of FIGS. 3 and 4 is somewhat simplified since multiple binary digit information is presented as if it were single binary digit information. Thus, in practice, arrays of electronic switches, gates, etc. will actually be employed to handle the added dimension as may necessary and entirely conventionally. Further, timing signals and logic for incorporating the inventive structure into a given data processing system environment will be those appropriate for that environment and will be the subject of straightforward logic design.

Thus, while the principles of the invention have now been made clear in an illustrative embodiment, there will be immediately obvious to those skilled in the art many modifications of structure, arrangements, proportions, the elements, materials, and components, used in the practice of the invention which are particularly adapted for specific environments and operating requirements without departing from those principles.

What is claimed is:

1. In a data processing system incorporating a cache memory and a main memory, a method for predicting subsequent cache request addresses from historic cache miss addresses comprising:

during the system hardware, firmware and software design procedure, performing the preliminary step of:
(A) establishing a first in, first our miss stack for storing a plurality of cache miss addresses by employing at least a selected one of hardware, firmware and software design and implementation techniques;

and, during system operation, performing the following steps within the system;
(B) waiting for a cache miss resulting from the absence in the cache of called information requested of the cache;
(C) when a cache miss occurs, placing the address of the absent called information onto the top of the miss stack;
(D) examining the miss stack for an address pattern among the cache is addreses resident therein following step C;
(E) if a pattern is not matched, returning to step B); and
(F) if a pattern is matched:
(1) using the matched pattern and at least one of the addresses in the miss stack to calculate a predictive address pointed to a signal group stored in the main memory;
(2) prefetching into cache memory from the main memory the signal group identified by the predictive address; and
(3) returning to step (B).

2. The method of claim 1 in which, during step (D), a repertoire of predetermined address patterns are searchable, and the examination continues from pattern to pattern until a first pattern match is sensed.

3. In a data processing system incorporating a cache memory and a main memory, a method for predicting subsequent cache request addresses from historic cache miss addresses comprising:

during the system hardware, firmware and software design procedure, performing the preliminary step of:
(A) establishing a first in, first out miss tack for storing a plurality of cache miss addresses by employing at least a selected one of hardware, firmware and software design and implementation techniques;

and, during system operation, performing the following steps within the system:

(B) waiting for a cache miss resulting from the absence in the cache of called information requested of the cache;

(C) when a cache miss occurs, placing the address of the called information onto the top of the miss stack;

(D) selecting, from among a plurality of pattern groups comprising a pattern repertoire, a current pattern group;

(E) examining the cache miss addresses resident in the miss stack for a match with a selected address pattern in the current pattern group;

(F) if the selected pattern is not matched, determining if all the patterns in the current pattern group have been examined;

(G) if all the patterns in the current pattern group have not been examined, selecting, from the current pattern group, a different pattern than the pattern last examined and returning to step (E);

(H) if all the patterns in all the pattern groups in the pattern repertoire have been searched, returning to step (B);

(I) if all the patterns in the current pattern group have been examined, assigning a new pattern group, different from the pattern group last examined, as the current pattern group and returning to step (E); and (J) if the selected pattern is matched:
  (1) using the matched pattern and at least one of the addresses in the miss stack to calculate a predictive address pointed to a signal group stored in the main memory;
  (2) prefetching into cache memory from the main memory the signal group identified by the predictive address; and
  (3) assigning another group as the current group and returning to step (E).

4. The method of claim 3 in which, intermediate substeps (J)1) and (J)3), there is preformed substep (J)2)a) in which the predictive address is placed onto the top of the miss stack.

5. Apparatus for developing a predictive address for prefetching signal groups, each identified by an address, from a main memory into a cache memory comprising:

(A) a first in, first out stack for storing a plurality of addresses representing successive cache misses;

(B) a plurality of electronic switch means each having a plurality of address inputs and a single address output;

(C) means coupling said addresses stored in said stack individually to said electronic switch means inputs in predetermined orders;

(D) means for switching said electronic switch means to transfer said addresses applied to said electronic switch means inputs to said electronic switch means output to establish at said electronic switch outputs predetermined combinations of said addresses;

(E) at least two subtraction circuit means, each said subtraction circuit means being coupled to receive a unique pair of addresses from said electronic switch means output and to issue a value representing the displacement therebetween;

(F) at least one comparator circuit means coupled to receive a pair of outputs from a corresponding pair of said subtraction circuit means and responsive thereto for issuing a prefetch enable logic signal if there is a compare condition; and (G) predictive address development means adapted to combine one of said addresses appearing at one of said electronic switch outputs and displacement information appearing at one of said subtraction circuit means to obtain a predictive address;

whereby, the coordinate presence of said predictive address and said prefetch enable logic signal causes the signal group identified by said predictive address to be prefetched from said main memory into said cache memory.

6. The apparatus of claim 5 which includes at least three of said subtraction circuit means and at least two of said comparator circuit means and which further comprises:

(A) AND-gate means having separate inputs respectively receiving outputs coupled from said at least two comparator circuit means, said AND-gate selectively issuing said prefetch enable logic signal only when fully enabled.

7. The apparatus of claim 6 which further includes:

(A) OR-gate means driving at least one input to said AND-gate means, said OR-gate means having inputs receiving:
  1. outputs coupled from at least one of said comparator circuits; and
  2. a selectively applied reduce lookahead logic signal;

whereby, application of said reduce lookahead signal to said OR-gate means partially enables said AND-gate means driven thereby and thus eliminates said at least one of said comparator circuits from consideration in the issuance of said prefetch enable logic signal.

* * * * *

UNITED STATES PATENT AND TRADEMARK OFFICE
CERTIFICATE OF CORRECTION

PATENT NO. : 5,093,777
DATED : March 3, 1992
INVENTOR(S) : Charles P. Ryan

It is certified that error appears in the above-indentified patent and that said Letters Patent is hereby corrected as shown below:

Column 6, Line 22: Delete "our"   Insert in place thereof --out--
Column 6, Line 36: Delete "is"   Insert in place thereof --miss--
Column 6, Line 36: Delete "addreses"   Insert in place thereof --addresses--
Column 7, Line 40: Delete "preformed"   Insert in place thereof --performed--

Signed and Sealed this

Sixteenth Day of May, 1995

Attest:

BRUCE LEHMAN

*Attesting Officer*              *Commissioner of Patents and Trademarks*